United States Patent [19]
Landis et al.

[11] Patent Number: 5,333,897
[45] Date of Patent: Aug. 2, 1994

[54] SNAP LOCK PIN INFLATABLE RESTRAINT MODULE MOUNTING MECHANISM

[75] Inventors: Paul M. Landis, Englewood; James L. Webber, Spring Valley; Barry C. Worrell, Centerville, all of Ohio

[73] Assignee: General Motors Corporation, Detroit, Mich.

[21] Appl. No.: 140,822

[22] Filed: Oct. 25, 1993

[51] Int. Cl.$^5$ ............................................. B60R 21/16
[52] U.S. Cl. .............................. 280/728 A; 280/750; 280/731; 280/732; 200/61.54
[58] Field of Search .............. 280/728 A, 743 R, 750, 280/728 R, 731, 732; 200/61.54, 61.55, 61.56, 61.57

[56] References Cited

U.S. PATENT DOCUMENTS

| | | | |
|---|---|---|---|
| 4,785,144 | 11/1988 | Fosnaugh et al. | 200/61.55 |
| 4,793,631 | 12/1988 | Takada | 280/728 A |
| 4,893,521 | 1/1990 | Iduide et al. | 280/750 X |
| 4,988,119 | 1/1991 | Hartmayer | 280/728 A |
| 5,005,860 | 4/1991 | Mori et al. | 280/731 |
| 5,085,461 | 2/1992 | Shibata | 280/731 |
| 5,087,069 | 2/1992 | Corbett et al. | 280/731 |
| 5,199,834 | 4/1993 | Seidl et al. | 280/728 A X |
| 5,228,362 | 7/1993 | Chen et al. | 280/721 X |
| 5,235,146 | 8/1993 | Sazuki | 280/731 X |
| 5,239,147 | 8/1993 | Allarel et al. | 200/61.54 |

Primary Examiner—Margaret A. Focarino
Assistant Examiner—Christopher P. Ellis
Attorney, Agent, or Firm—Charles E. Leahy

[57] ABSTRACT

An inflatable restraint module mounting mechanism is disclosed for use in mounting an inflatable restraint module to a support structure such as the hub portion of a steering wheel or a dashboard, on a vehicle. The inflatable restraint module is provided with a plurality of pin members which are adapted to pass through and be retained within apertures in a support plate. The pin members are slidable through the apertures and include clip members for engaging the support plate to thereby retain the restraint module on the support plate. The clip members are formed of a resilient material whereby the clip members are adapted to bias locking members radially outwardly for engaging the support plate and to prevent the pin members from separating from the apertures.

11 Claims, 3 Drawing Sheets

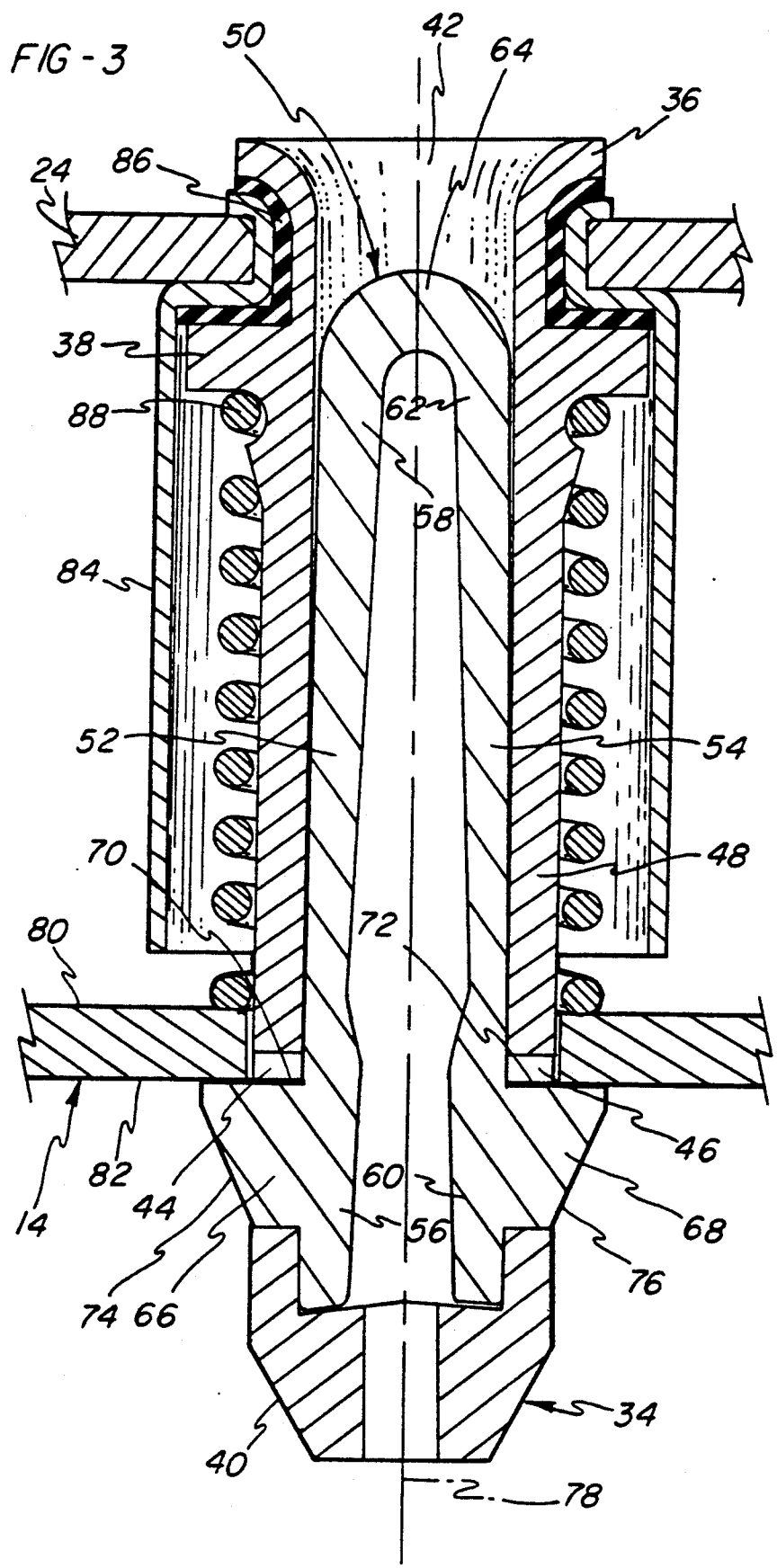

SNAP LOCK PIN INFLATABLE RESTRAINT MODULE MOUNTING MECHANISM

BACKGROUND OF THE INVENTION

1. Field of the Invention

This invention relates generally to a supplemental inflatable restraint and, more particularly, to a mechanism for quickly mounting an inflatable restraint module to a supporting structure.

2. Description of Related Art

In the past, supplemental inflatable restraints have been incorporated into the steering wheel of automobiles in order to protect the driver of the automobile in the event of a collision. In addition, supplemental inflatable restraints have also been incorporated into the dashboard of automobiles in order to protect the front seat passenger. Conventional supplemental inflatable restraints comprise a restraint module which houses an inflatable air bag and an inflator. The module further includes a pad or door portion covering the front portion of the module and which is adapted to open and permit deployment of the air bag.

Various mechanisms have been produced for securing the inflatable restraint module to a support structure in a vehicle, such as the steering wheel or dashboard. In one known mounting system, bolts are provided passing from the rear of the support wherein the bolts threadably engage threaded nuts mounted on the restraint module. It is further known to provide such a restraint module mounting system for a vehicle steering wheel wherein sleeve members mounted to the restraint module and surrounding the mounting bolts may be forced into contact with a plate forming the supporting structure on the steering wheel hub to complete a circuit for actuating a horn.

In another known restraint module mounting system, a plurality of hollow support members are mounted to the hub portion of a steering wheel for receiving mounting members depending from the restraint module. Spring clips are provided for engaging through slots or recesses in the support members and mounting members to releasably secure the mounting members within the support members when the restraint module is moved into place within the hub portion. In this mounting system, the restraint module is immovably held in fixed relation relative to the hub forming the mounting structure.

It is desirable to provide a supplemental inflatable restraint module mounting mechanism wherein the module is adapted to be mounted to support structures without requiring the use of conventional fasteners, such as screws or bolts. It is also desirable to provide such a mounting arrangement wherein the restraint module is retained on a support structure in response to movement of the restraint module in a direction toward the support structure.

SUMMARY OF THE INVENTION

It is therefore a primary object of the present invention to provide an inflatable restraint module mounting mechanism which permits the inflatable restraint module to be mounted to a support structure of a vehicle, such as a steering wheel or dashboard, without requiring access to the rear face of the support structure.

In one aspect, this invention comprises a mounting mechanism for use in combination with a supplemental inflatable restraint module wherein the mechanism includes a support plate having opposing front and rear faces and a plurality of apertures therethrough for receiving pin members attached to the inflatable restraint module. Each of the pin members is formed with a hollow interior and includes a distal end movable in a first direction past the front face of the support plate, and the distal end of each pin member includes openings extending through the pin member to the interior thereof. In addition, a clip member is provided located within the interior of each of the pin members, each clip member including opposing first and second locking members and a resilient portion resiliently connecting the first locking member to the second locking member. The locking members extend through the openings to locations outside of the pin members for engaging the rear face of the support plate whereby the distal ends are prevented from moving through the support plate in a second direction opposite to the first direction.

In a further aspect of the invention, each of the locking members includes a substantially straight locking surface for engaging the rear face of the support plate and a guide surface which is angled inwardly from a location adjacent to a radially outer edge of the locking surface. The guide surfaces guide the locking members into a retracted position within the pin members during movement in the first direction. Upon the locking members passing the rear face of the support plate, the locking members will be caused to spring outwardly to thereby prevent the distal ends of the pin members from being retracted from the support plate in the second direction.

other objects and advantages of the invention will be apparent from the following description, the accompanying drawings, and the appended claims.

BRIEF DESCRIPTION OF THE DRAWINGS

FIG. 3 is an enlarged cross-sectional elevational view illustrating the details of one of the pin members shown in FIG. 2.

DETAILED DESCRIPTION OF THE PREFERRED EMBODIMENT

Figure 1:
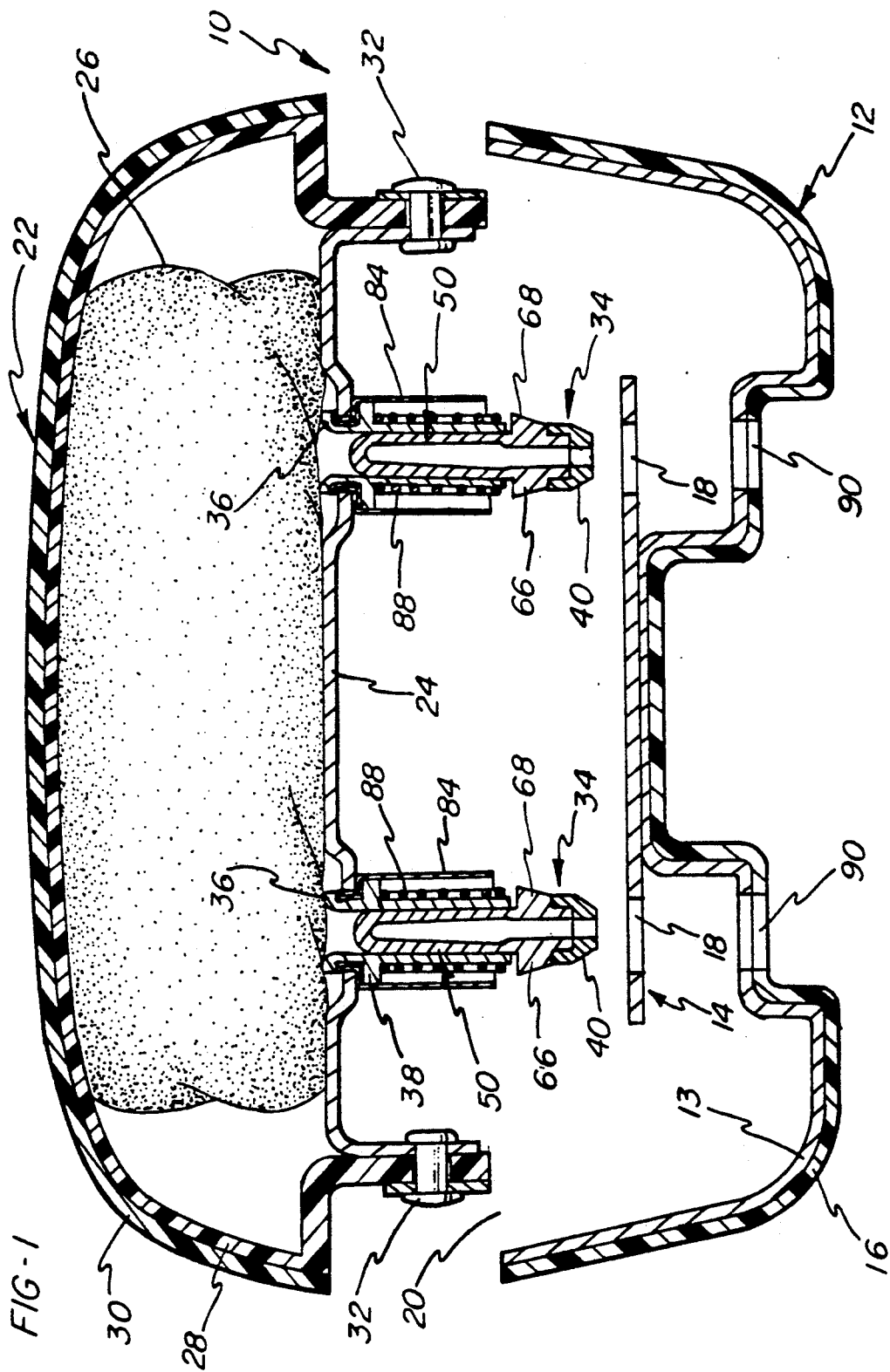
FIG. 1 is a cross-sectional elevational view illustrating the inflatable restraint module mounting mechanism of the present invention in combination with a vehicle steering wheel prior to assembly of the inflatable restraint module to a hub portion of the steering wheel.
Figure 2:
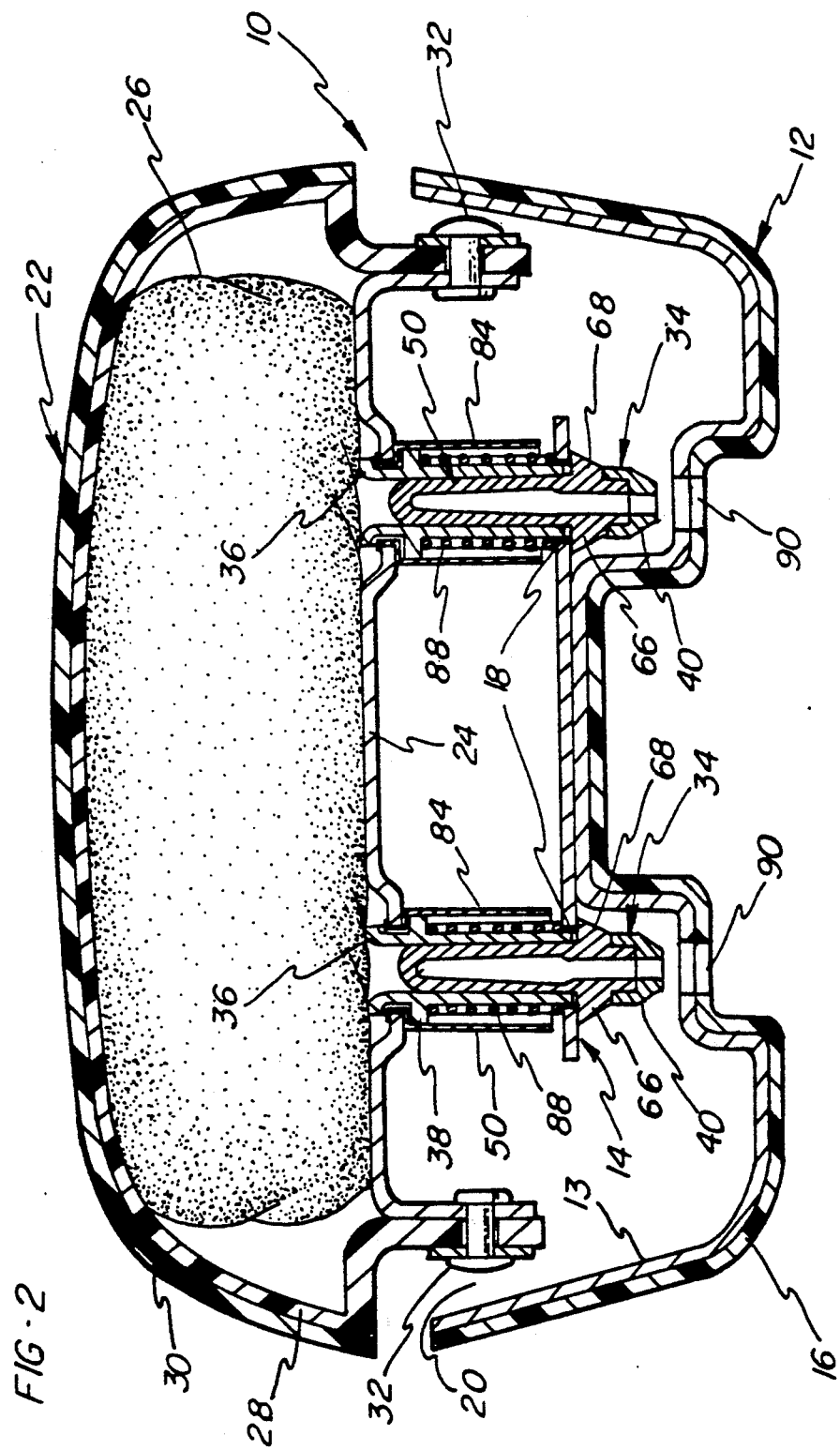
FIG. 2 is a cross-sectional elevational view similar to FIG. 1 in which the inflatable restraint module has been assembled onto a support plate of the steering wheel hub portion.

Referring initially to FIGS. 1 and 2 of the drawings, the inflatable restraint module mounting mechanism of the present invention will be described with reference to use of the mechanism in combination with a vehicle steering wheel 10 including a hub portion 12 of molded plastic material and a rim portion (not shown) connected to the hub portion by spoke portions (not shown). However, it should be noted that the present invention is equally applicable for mounting inflatable restraint modules on other vehicle structures, such as on a dashboard for a vehicle.

The hub portion 12 includes a metal frame portion 13 surrounded by a molded plastic exterior 16, and is mounted on a steering shaft (not shown) of a vehicle in a conventional manner. A support plate 14 is welded to the frame portion 13 of the hub portion 12. The support plate 14 includes a plurality of holes 18 formed therethrough and, iu the preferred embodiment, four such holes are provided.

The hub portion 12 includes an opening 20 for receiving an inflatable occupant restraint module 22. The inflatable restraint module 22 is conventional and generally includes a base plate 24 for mounting a bag and inflator, depicted generally as 26. The bag and inflator 26 are encapsulated in a container 28 which is covered by an outer soft cover or pad 30. The container 28 is bolted to the base plate 24 by fasteners 32 to form the assembled module 22.

A plurality of elongated cylindrical pin members 34 are mounted to the base plate 24 and extend therefrom toward the support plate 14. The number and relative position of the pin members 34 corresponds to the number and position of the apertures 18 formed in the mounting plate 14. Each of the pin members 34 includes a fixed end 36 which is flared radially outwardly to act cooperation with a shoulder 38 of the pin member 34 to hold the member 34 rigidly in place on the base plate 24. A distal end 40 of each pin member 34 is sized to be received through a respective aperture 18.

Referring further to FIG. 3, each of the pin members 34 is formed with a hollow interior 42 and includes a pair of diametrically opposed openings 44 and 46 extending through a wall 48 of the pin member 34 to the interior 42.

In addition, a resilient clip member 50 is located within the interior 42 of the pin member 34, is preferably formed of spring steel. The clip member 50 includes first and second elongated legs 52 and 54 wherein the leg 52 includes a first end 56 and a second end 58, and the second leg includes a first end 60 and a second end 62. A u-shaped portion 64 connects the second ends 58 and 62 and defines a resilient portion for flexing during movement of the first and second legs 52 and 54 relative to each other.

First and second locking members 66 and 68 are formed integrally with the first ends 56 and 60 of the legs 52 and 54, respectively. The first and second locking members 66 and 68 each include respective locking surfaces 70 and 72, and guide surfaces 74 and 76. The locking surfaces 70 and 72 extend radially outwardly substantially perpendicular to a longitudinal axis 78 of the pin member 34, and the guide surfaces 74 and 76 extend inwardly at an angle from a location adjacent to a radially outer edge of the locking surfaces 70 and 72 toward the longitudinal axis 78.

The clip member 50 acts to resiliently bias the locking members 66 and 68 to extend through the openings 44 and 46 to locations exterior of the pin member 34. Thus, as the pin members 34 are moved into association with the apertures 18 to mount the restraint module 22 to the hub portion 12, the guide surfaces 74 and 76 will contact a front face 80 of the support plate 14 whereby the locking members 66 and 68 will be cammed into the 34 to facilitate passage of the distal ends 40 through the support plate 14. In addition, it should be noted that the distal end 40 of the pin member 34 is preferably tapered in order to facilitate initial passage of the pin member 34 through the aperture 18. Once the distal end 40 of the pin member 34 has passed through the support plate 14, the clip member 50 will cause the locking members 66 and 68 to move radially outwardly to position the locking surfaces 70 and 72 in parallel relationship adjacent to a rear face 82 of the support plate 14 whereby passage of the distal end 40 out of association with the support plate 14 is prevented.

It should be noted that as a result of forming the locking surfaces 70 and 72 as generally straight surfaces parallel to the rear face 82, a substantial contact area is established between the rear face 82 and the locking members 66 and 68. This substantial contact area provides for a positive locking engagement between the clip member 50 and the support plate 14.

The restraint module 22 is further provided with elements forming a switch for a horn actuating circuit. Specifically, tubular contact members 84 are mounted to the plate 24 surrounding the pin members 34 and extending toward the support plate 14. It should be understood that the support plate 14, base plate 24, pin members 34 and contact members 84 are preferably formed of a conductive metal material. The contact members 84 define a first contact portion for the switch and the portions of the support plate 14 located in alignment with the end surfaces of the contact members 84 define a second contact portion for the switch. In order to prevent the pin members 34 from forming a continuous electrical path between the contact members 84 and the support plate 14, insulating bushings 86 are provided between each of the contact members 84 and a respective pin member 34.

In addition, return springs 88 are provided for biasing the restraint module 22 in a direction away from the support plate 14 to an outer position whereby the contact members 84 are normally maintained out of contact with the support plate 14. When a driver of a vehicle applies a force to the restraint module 22 sufficient to overcome the bias of the spring 88, the contact members 84 will move to an inner position in contact with the support plate 14 to thereby complete a horn activating circuit in combination with a power source (not shown) which is connected across the contact members 84 and the support plate 14.

It should be apparent from the above description that the restraint module 22 may be mounted to the hub portion 12 without the use of tools and without requiring access to the rear of the steering wheel 10. Further, it should be apparent that the locking members 66 and 68 of the clip member 50 form a locking means for cooperating with the rear face 82 of the support plate 14 to prevent removal of the restraint unit 22 from the hub portion 12. However, if it is necessary to provide for removal of the restraint unit 22, apertures 90 may be provided in the hub portion 12 in order to permit a tool to be inserted to move the locking members 66 and 68 together to permit passage of the pin members 34 out of the apertures 18.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In combination with a supplemental inflatable restraint module, an inflatable restraint module mounting mechanism comprising:
    a support plate having opposing front and rear faces and a plurality of apertures therethrough,
    pin members attached to said inflatable restraint module, each said pin member being formed with a hollow interior and including a distal end movable through one of said apertures in a first direction past said front face of said support plate, and the distal end of each said pin member including openings extending through said pin member to said interior, and a clip member located within the interior of each of said pin members, each said clip member including opposing first and second locking members and a resilient portion resiliently connecting said first locking member to said second locking member, said resilient portion acting to bias said locking members to extend through said openings to locations outside of said pin members for engaging said rear face of said support plate whereby said distal ends are prevented from moving through said support plate in a second direction opposite to said first direction.

2. The mechanism as recited in claim 1 wherein said resilient portion comprises first and second elongated leg portions having first and second ends and a U-shaped portion connecting said first and second leg portions at said second end.

3. The mechanism as recited in claim 2 wherein said first and second leg portions and said U-shaped portion are formed of spring steel.

4. The mechanism as recited in claim 2 wherein said locking members are mounted to the first ends of said leg portions.

5. The mechanism as recited in claim 1 wherein each of said locking members include a substantially straight locking surface for engaging said rear face of said support plate to prevent said movement in said second direction, and said locking members further include a guide surface angled inwardly from a radially outer edge of said locking surface for guiding said locking members into a retracted position within said members during said movement an said first direction.

6. The mechanism as recited in claim 1 wherein said inflatable restraint module is movable relative to said support plate between inner and outer positions and including first and second horn contact portions on said inflatable restraint module and said support plate, respectively, said first horn contact portion being disposed to engage said second horn contact portion when said inflatable restraint module is in said inner position to complete a circuit for actuating a horn.

7. In combination with a supplemental inflatable restraint module, an inflatable restraint module mounting mechanism comprising:

a support plate having opposing front and rear faces and a plurality of apertures therethrough, elongated pin members attached to said inflatable restraint module, each said pin member defining a longitudinal axis and including a distal end for passage through one of said apertures in said support plate, first and second locking members supported within each of said pin members at said distal end, each said locking member including a locking surface extending radially outwardly substantially perpendicular to the longitudinal axis of a respective pin member and a guide surface extending inwardly at an angle from a radially outer edge of said locking surface toward said longitudinal axis, and wherein movement of said pin members in a first direction past said front face of said support plate causes said guide surfaces of said locking members to cam said locking members into said pin members to facilitate passage of said distal end of said pin members through said support plate, and further causes said locking surfaces to be disposed to engage said rear face of said support plate to prevent passage of said distal ends through said support plate in a second direction to said first direction.

8. The mechanism as recited in claim 7 including a clip member located within each of said pin members wherein said first and second locking members are formed integrally with a respective clip member, said clip member acting to resiliently bias said locking members radially outwardly for engagement with said support plate.

9. The mechanism as recited in claim 8 wherein each said clip member comprises first and second elongated leg portions having first and second ends, said locking members being mounted to said first end and including a U-shaped portion connecting said first and second leg portions at said second end.

10. The mechanism as recited in claim 7 wherein said inflatable restraint module is movable relative to said support plate between inner and outer positions and including first and second horn contact portions on said inflatable restraint module and said support plate, respectively, said first horn contact portion being disposed to engage said second horn contact portion when said inflatable restraint module is in said inner position to complete a circuit for actuating a horn.

11. In combination with a supplemental restraint module for a vehicle, an inflatable restraint module mounting mechanism comprising:

a support plate having opposing front and rear faces and a plurality of apertures therethrough, elongated pins rigidly attached to said inflatable restraint module, each said pin defining a longitudinal axis and including a distal end for passage through a respective aperture in said support plate, means defining a hollow interior portion extending longitudinally through each of said pins and diametrically opposed openings at said distal end extending through said pin to said interior portion, a resilient clip member located within the interior of each of said pins, each said clip member including first and second elongated legs having first and second ends and a U-shaped portion connecting said first and second legs at said second ends, first and second locking members formed integrally with said first ends of said legs, each said locking member including a substantially straight locking surface extending radially outwardly substantially perpendicular to the longitudinal axis of a respective pin and a guide surface extending inwardly at an angle from a location adjacent to a radially outer edge of said locking surface toward said longitudinal axis, said clip member acting to resiliently bias said locking members to extend through said opposed openings to locations exterior of a respective pin, and wherein movement of said pins in a first direction past said front face of said support plate causes said guide surfaces of said locking members to cam said locking members into said pins to facilitate passage of said distal ends through said support plate, and further causes said locking surfaces to be disposed in parallel relationship adjacent to said rear face of said support plate to prevent passage of said distal ends through said support plate in a second direction opposite to said first direction.

* * * * *